(12) United States Patent
Kempfle et al.

(10) Patent No.: US 10,281,133 B2
(45) Date of Patent: May 7, 2019

(54) REFRIGERATION APPLIANCE HAVING A DOOR

(71) Applicant: BSH HAUSGERAETE GMBH, Munich (DE)

(72) Inventors: Stephan Kempfle, Ellzee (DE); Armin Weber, Lauchheim (DE); Ralf Daucher, Neu-Ulm (DE); Andreas Danler, Voels (AT)

(73) Assignee: BSH Hausgeraete GmbH, Munich (DE)

( * ) Notice: Subject to any disclaimer, the term of this patent is extended or adjusted under 35 U.S.C. 154(b) by 71 days.

(21) Appl. No.: 15/050,652

(22) Filed: Feb. 23, 2016

(65) Prior Publication Data

US 2016/0245504 A1   Aug. 25, 2016

(30) Foreign Application Priority Data

Feb. 23, 2015   (DE) ................ 10 2015 203 186

(51) Int. Cl.
| | |
|---|---|
| *F21V 7/04* | (2006.01) |
| *F21V 33/00* | (2006.01) |
| *F21V 8/00* | (2006.01) |
| *F25D 27/00* | (2006.01) |
| *F21W 131/305* | (2006.01) |
| *F21Y 115/15* | (2016.01) |

(52) U.S. Cl.
CPC .......... *F21V 33/0044* (2013.01); *F25D 27/00* (2013.01); *G02B 6/0011* (2013.01); *F21W 2131/305* (2013.01); *F21Y 2115/15* (2016.08)

(58) Field of Classification Search
CPC .............. F25D 27/00; F25D 2327/001; F25D 2400/40; F25D 23/02; F24C 15/008; F24C 7/082
USPC ......................................... 362/615
See application file for complete search history.

(56) References Cited

U.S. PATENT DOCUMENTS

| | | | | |
|---|---|---|---|---|
| 6,517,213 B1 * | 2/2003 | Fujita | ................ | G09F 13/04 362/23.18 |
| 7,239,131 B2 | 7/2007 | Halder et al. | | |
| 8,021,009 B2 * | 9/2011 | Knoll | ................ | A47F 3/001 362/602 |
| 8,490,426 B2 * | 7/2013 | Kim | ................ | F25D 23/04 62/264 |
| 2004/0082367 A1 * | 4/2004 | Nakanishi | ......... | G02F 1/133553 455/566 |
| 2006/0138916 A1 * | 6/2006 | Kordon | ............... | F21V 33/0044 312/223.5 |
| 2006/0201181 A1 | 9/2006 | Bauer et al. | | |
| 2007/0133192 A1 * | 6/2007 | Alessandro | ........... | A47F 3/0434 362/125 |

(Continued)

FOREIGN PATENT DOCUMENTS

| | | |
|---|---|---|
| DE | 10239904 A1 | 3/2004 |
| DE | 10339904 A1 | 3/2005 |

*Primary Examiner* — Thien M Le
(74) *Attorney, Agent, or Firm* — Laurence A. Greenberg; Werner H. Stemer; Ralph E. Locher

(57) ABSTRACT

A refrigeration appliance includes a door having a door rack or racks on the inside of a door leaf and a surface luminaire or lighting fixture disposed substantially perpendicular to the door leaf. The surface luminaire extends in the vertical direction beyond the door rack or racks and serves to illuminate an interior storage space. The surface luminaire is preferably an OLED.

15 Claims, 2 Drawing Sheets

(56) References Cited

U.S. PATENT DOCUMENTS

| | | | |
|---|---|---|---|
| 2010/0180615 A1* | 7/2010 | Linder | A47F 3/0434 |
| | | | 62/248 |
| 2013/0128494 A1* | 5/2013 | Seo | F25D 27/00 |
| | | | 362/92 |
| 2014/0268646 A1* | 9/2014 | Kendall | F25D 27/005 |
| | | | 362/92 |
| 2017/0184335 A1* | 6/2017 | Jeon | F25D 23/02 |

* cited by examiner

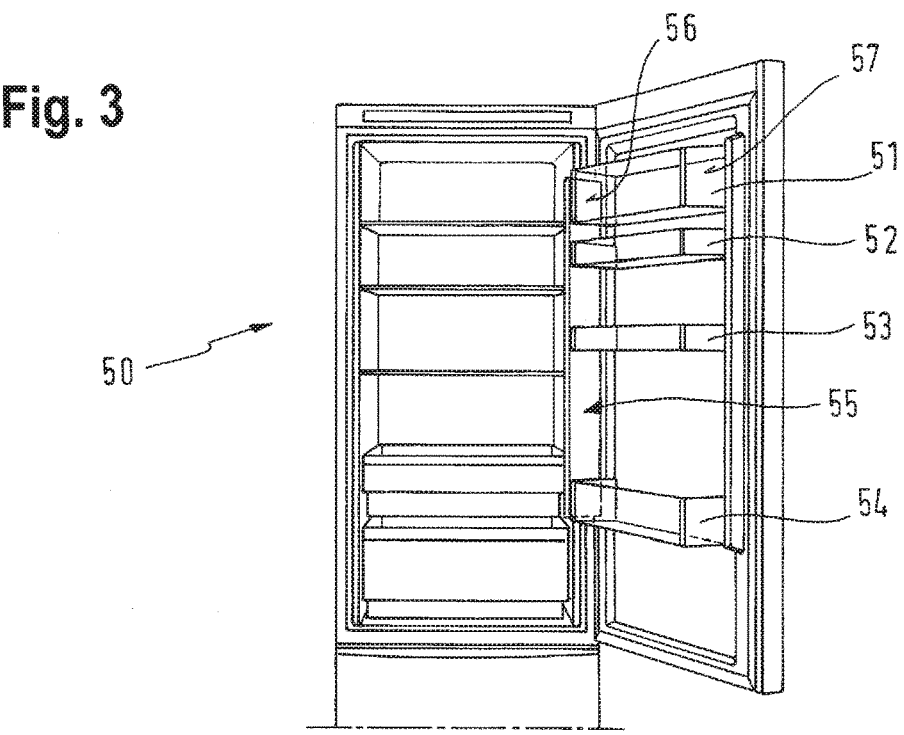
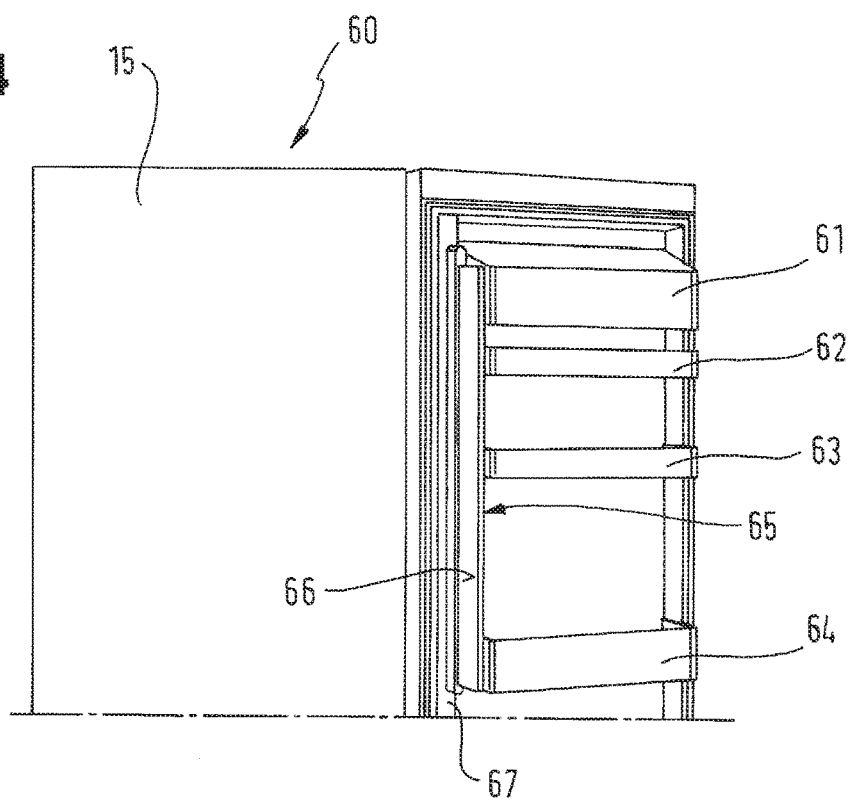

REFRIGERATION APPLIANCE HAVING A DOOR

CROSS-REFERENCE TO RELATED APPLICATION

This application claims the priority, under 35 U.S.C. § 119, of German Patent Application DE 10 2015 203 186.1, filed Feb. 23, 2015; the prior application is herewith incorporated by reference in its entirety.

BACKGROUND OF THE INVENTION

Field of the Invention

The present invention relates to a refrigeration appliance having a door, a door rack on an inside of a door leaf and a surface luminaire or lighting fixture disposed substantially perpendicular to the door leaf.

Refrigeration appliances having a surface luminaire for illuminating a storage space are known. German Patent Application DE 103 39 904 A1, corresponding to U.S. Publication US 2006/0201181 A1, discloses a refrigeration appliance having a door with a door rack on an inside of one door leaf. The door rack has an end wall which is disposed substantially perpendicular to the door leaf and on which an OLED surface luminaire is mounted or into which an OLED surface luminaire is integrated in a further embodiment.

A disadvantage of that surface luminaire is that the position of the luminaire depends on the position of the door rack. A further disadvantage is that the surface luminaire is dimensioned in line with the small footprint of the end face of the door rack.

SUMMARY OF THE INVENTION

It is accordingly an object of the invention to provide a refrigeration appliance having a door, which overcomes the hereinafore-mentioned disadvantages of the heretofore-known appliances of this general type and which has an improved surface luminaire or light fixture in a door in order to illuminate a storage space.

With the foregoing and other objects in view there is provided, in accordance with the invention, a refrigeration appliance including a door which has a door leaf, a door rack on an inside of the door leaf and a surface luminaire disposed substantially perpendicular to the door leaf, in which the surface luminaire extends in the vertical direction beyond the door rack. The technical advantage which is thereby achieved is that the illumination depends less heavily on the position of the door rack. A further technical advantage is that a larger surface than the end face of the door rack is available for the surface luminaire.

In that which follows, embodiments of the refrigeration appliance of the invention are described which have an advantageous effect individually or in combination.

Preferably, the surface luminaire has a semitransparent or transparent pane, in particular a glass pane. This achieves the technical advantage of making a stable substrate material available in an appropriately shaped geometry. Alternatively, the pane can be a semitransparent or transparent plastic pane.

In a preferred embodiment of the invention the surface luminaire is disposed next to an end face of the door rack. In particular, the surface luminaire can be disposed in parallel to an end face of the door rack. As a result, the door rack can, technically advantageously, make good use of the space and reach as far as the surface luminaire.

In a preferred embodiment of the invention the surface luminaire is disposed near the edge of the door leaf facing a door hinge. This position is preferred, in order to illuminate the storage space when the door is open by irradiation away from the door racks.

The surface luminaire advantageously has an even or plane shape. Such a shape is the easiest to manufacture.

The surface luminaire can, however, also have a curved surface or can be free-form in construction. This firstly permits construction freedoms and secondly alignment to curved door racks.

According to a further advantageous embodiment the surface luminaire extends in the direction of the depth of the door rack at least over a part of the depth of the door rack. This permits the provision of a surface luminaire which not only has a sufficiently large illuminating surface, but which also does not extend too far into the interior. A further advantageous dimensioning of the surface luminaire provides the surface luminaire with the same depth as the door racks when viewed from the door leaf. This embodiment permits a maximum extension of the surface luminaire in the depth direction, without the surface luminaire projecting beyond the door rack into the interior.

According to a preferred embodiment of the invention the surface luminaire radiates away from the door rack. Thus, when the door is open the surface luminaire can satisfactorily illuminate the interior storage space of the refrigerator in the vicinity of the door hinge.

According to a further preferred embodiment of the invention the surface luminaire radiates toward the door rack. This permits good illumination of the storage space of the door racks.

Preferably the surface luminaire has an inscription. Thus logos, symbols and instructions in backlit form are possible.

In a particularly advantageous embodiment of the invention the surface luminaire has an OLED at least over part of the surface. The OLED can irradiate on one side in the direction away from the door racks or can irradiate on one side in the direction of the door racks or can irradiate on both sides. The OLED makes it possible to provide an energy-efficient light source having an even illumination density and it can be aligned to the contour of the surface luminaire. The OLED emits a diffuse light for the interior illumination.

Furthermore, the OLED surface luminaire can be constructed to be transparent or semitransparent. This makes possible a surface luminaire which both emits light and simultaneously can be seen through. When disposed on the side of the door opening such a transparent or semitransparent OLED light enables the refrigerated goods in the storage space of the door racks to be illuminated and simultaneously to be inspected.

According to a further advantageous embodiment of the invention the surface luminaire has a light guide. The light guide enables light to be coupled in from the door-leaf-side end face of the light guide and to be irradiated firstly out of one surface and secondly from an end face, in particular out of the end face opposite the side on which light is coupled in. The preferred light source is the LED although an OLED is also possible.

An alternative embodiment is the combination of a semitransparent or transparent pane with a light chain.

The power supply for the surface luminaire can advantageously come from the body into the door leaf through a door hinge, and in the door leaf through a strut or channel into the surface luminaire.

Other features which are considered as characteristic for the invention are set forth in the appended claims.

Although the invention is illustrated and described herein as embodied in a refrigeration appliance having a door, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a front perspective view of a further refrigeration appliance according to a further embodiment of the invention; and FIG. 4 is a side perspective view of a refrigeration appliance with a door open according to an additional embodiment of the invention.

DETAILED DESCRIPTION OF THE INVENTION

Figure 1:
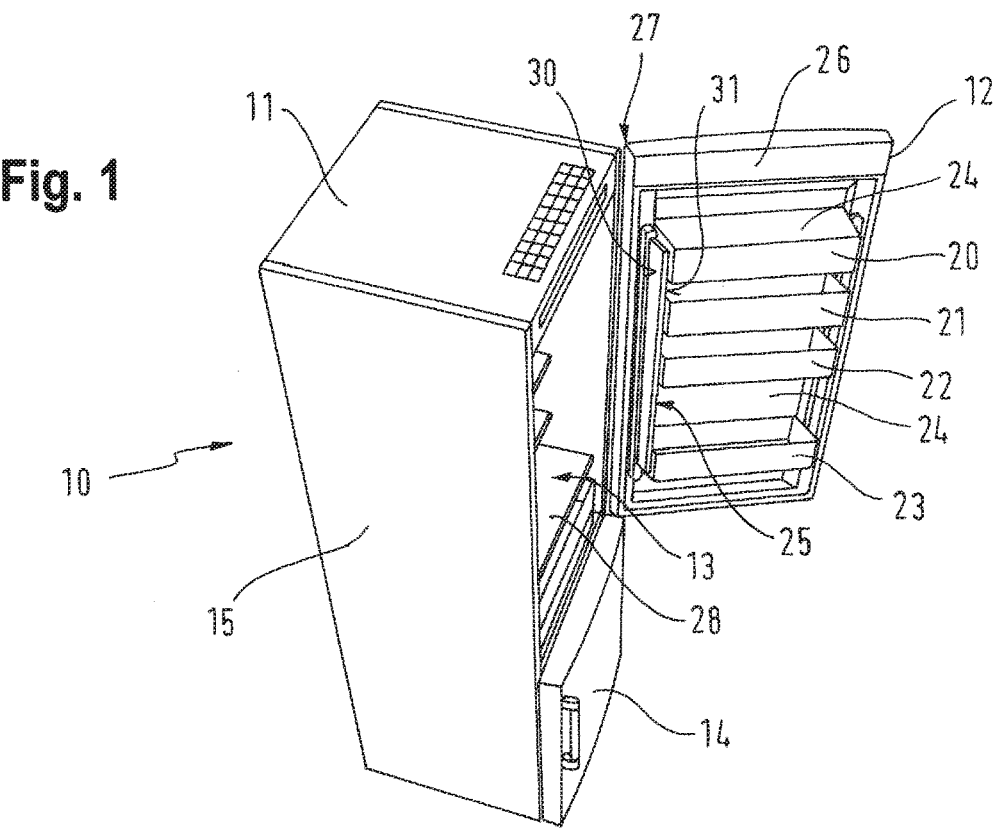
FIG. 1 is a diagrammatic, perspective view of a refrigeration appliance having a surface luminaire according to one embodiment of the invention.

In the figures configurations which are independent of one another are realized in the same embodiment for the sake of conciseness. Identical reference characters in different figures refer to elements which are the same or which have the same effect. The configurations show a refrigeration appliance with a storage space for refrigerated goods and a storage space for frozen goods. Refrigeration appliances with only one storage space and combinations with further storage spaces are also covered by the invention.

Referring now to the figures of the drawings in detail and first, particularly, to FIG. 1 thereof, there is seen a refrigeration appliance 10 having a body 11 and a door 12. The door 12 closes a door opening of the body 11 to a storage space 13 for refrigerated goods. The refrigeration appliance furthermore has a further storage space for frozen goods behind a door 14 which is shown as closed. The body 11 has an outer wall 15. The door 12 has door racks 20-23 which form a storage space 24 of the door racks.

The door 12 furthermore has a surface luminaire or lighting fixture 25 which is embodied as an OLED and which is disposed substantially perpendicular to a door leaf 26. The surface luminaire 25 extends in the vertical direction across all of the door racks 20-23 located on the inside of the door leaf 26. The surface luminaire thus extends in the vertical direction across each individual one of the door racks 20-23. The surface luminaire 25 is disposed adjacent the door racks 20-23 and in the illustrated embodiment adjoins end faces of the door racks 20-23.

The door leaf 26 of the door 12 has an edge 27 facing a door hinge. The surface luminaire 25 is disposed near this edge 27 facing the door hinge. The storage space 13 for refrigerated goods is substantially formed of an interior storage space 28 and the storage space 24 of the door racks.

The surface luminaire 25 can now firstly illuminate the interior storage space 28 with a surface 30 pointing toward the door hinge and secondly can illuminate the storage space 24 of the door racks with a surface 31 pointing toward the door racks 20-23.

Figure 2:
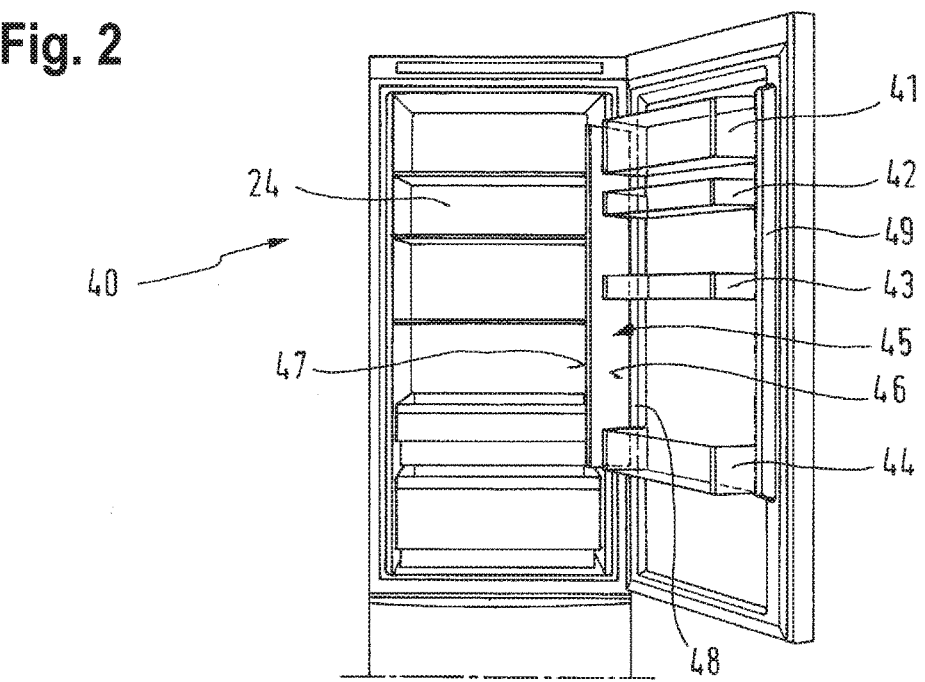
FIG. 2 is a front perspective view of a refrigeration appliance according to another embodiment of the invention.

FIG. 2 shows a front view of another refrigeration appliance 40 having door racks 41-44 and an OLED surface luminaire or lighting fixture 45. This surface luminaire 45 also has an even or plane shape and two illuminating surfaces 46 and 47. The illuminated surface 46 points toward the door racks 41-44 and the illuminating surface 47 lies opposite the illuminating surface 46, radiates away from the door racks and illuminates the interior storage space. In the depth direction the surface luminaire 45 extends out from the door leaf to the depth of the door racks. The surface luminaire 45 in this embodiment is spaced apart from the end faces of the door racks in the horizontal direction. The door racks 41-44 are enclosed by struts or channels 48 and 49. The surface luminaire 45 can be enclosed in a similar channel or strut. Such a channel or strut can also be used to supply power to the surface luminaire 45.

FIG. 3 shows a further refrigeration appliance 50 having door racks 51-54 and an OLED surface luminaire or lighting fixture 55. This surface luminaire 55 also extends in the depth direction away from the door leaf to the front edge of the door racks 51-54. In this exemplary embodiment the surface luminaire 55 adjoins the end faces of the door racks 51-54. Both end surfaces 56, 57 of the door rack 51 are transparent, so that the surface luminaire 55 illuminates through the door-hinge-side end face of the door rack. In the case of the further door racks 52-54 the door-hinge-side end faces are not transparent, but those of the end faces facing the door opening side are transparent.

FIG. 4 shows a side view of an additional refrigeration appliance 60 with a door open. The refrigeration appliance 60 has door racks 61-64 and an OLED surface luminaire or lighting fixture 65. In this embodiment the surface luminaire illuminates the interior storage space of the refrigeration appliance 60 with its illuminating surface 66 and illuminates the storage space of the door racks with the surface opposite the illuminating surface 66. The surface luminaire 65 illuminates at the height of the door racks through the transparent side surfaces of the door racks 61-64. In this embodiment a hinge-side door channel or strut 67 has two functions. Firstly the door strut or channel 67 encloses the surface luminaire 65 and secondly it anchors the door racks 61-64 on the hinge side.

The invention claimed is:

1. A refrigeration appliance, comprising:
   a door having a door leaf with an inside and a door rack on said inside of said door leaf, said door leaf having an edge facing a door hinge; and
   a surface luminaire disposed in said door substantially perpendicular to said door leaf and extending in the vertical direction beyond said door rack, said luminaire being disposed at said edge of said door leaf, said luminaire having a first illumination surface radiating away from said door rack in a direction towards said hinge.

2. The refrigeration appliance according to claim 1, wherein said surface luminaire has a semitransparent or transparent pane.

3. The refrigeration appliance according to claim 2, wherein said pane is a glass pane.

4. The refrigeration appliance according to claim 2, wherein said door rack has an end face, and said surface luminaire is disposed next to said end face of said door rack.

5. The refrigeration appliance according to claim 4, wherein said surface luminaire is disposed parallel to said end face of said door rack.

6. The refrigeration appliance according to claim 1, wherein said surface luminaire has a plane shape.

7. The refrigeration appliance according to claim 1, wherein said surface luminaire has a curved surface.

8. The refrigeration appliance according to claim 1, wherein said door rack has a depth defining a depth direction, and said surface luminaire extends in said depth direction at least across part of said depth of said door rack.

9. The refrigeration appliance according to claim 1, wherein said surface luminaire has a second illumination surface that radiates toward said door rack.

10. The refrigeration appliance according to claim 1, wherein said surface luminaire has an inscription.

11. The refrigeration appliance according to claim 1, wherein said surface luminaire has a surface and an OLED at least over part of said surface.

12. The refrigeration appliance according to claim 11, wherein said OLED surface luminaire is constructed to be transparent or semitransparent.

13. The refrigeration appliance according to claim 1, wherein said surface luminaire has a light guide.

14. The refrigeration appliance according to claim 1, wherein said surface luminaire has a light chain.

15. A refrigeration appliance, comprising:

a carcass defining an interior storage space;

a door connected by a door hinge to said carcass for closing said interior storage space, said door having a door leaf with an inside and a door rack on said inside of said door leaf, said door leaf having an edge facing said door hinge; and a surface luminaire disposed in said door substantially perpendicular to said door leaf and extending in the vertical direction beyond said door rack, said luminaire being disposed at said edge of said door leaf, said luminaire radiating away from said door rack and, in an open position of said door, illuminating said interior storage space in a vicinity of said door hinge.

* * * * *